(12) United States Patent
Kobayashi et al.

(10) Patent No.: US 6,372,295 B1
(45) Date of Patent: Apr. 16, 2002

(54) SUPPRESSING STAINING OF COATING BAKING OVENS

(76) Inventors: Yoshikazu Kobayashi; Yojiro Yamamoto, both of 1 banchi Shiohama-cho, Yokkaichi-city, Mie pref., 510 (JP)

( * ) Notice: Subject to any disclaimer, the term of this patent is extended or adjusted under 35 U.S.C. 154(b) by 0 days.

(21) Appl. No.: 09/525,138

(22) Filed: Mar. 14, 2000

(51) Int. Cl.$^7$ ................................................. B05D 3/02
(52) U.S. Cl. ................ 427/386; 427/372.2; 427/388.2; 523/456
(58) Field of Search ....................... 513/456; 427/372.2, 427/375, 386, 388.2

(56) References Cited

U.S. PATENT DOCUMENTS 5,412,040 A * 5/1995 Custro et al. ............ 525/332.9

FOREIGN PATENT DOCUMENTS

| JP | 59078230 | * | 5/1984 |
| JP | 08127635 | * | 5/1996 |
| JP | 11061077 | * | 3/1999 |

OTHER PUBLICATIONS

Printout of RN6683–19–8.*

* cited by examiner

*Primary Examiner*—Robert Dawson
*Assistant Examiner*—D. Aylward

(57) ABSTRACT

To provide an epoxy resin composition that does not stain a baking furnace or the like, and a coating composition containing the epoxy resin composition. An epoxy resin composition containing 0.001 to 5 parts by weight of a thermal decomposition inhibitor for 100 parts by weight of an epoxy resin, and a coating composition containing the epoxy resin composition and a curing agent for an epoxy resin.

19 Claims, No Drawings

SUPPRESSING STAINING OF COATING BAKING OVENS

BACKGROUND OF THE INVENTION

The present invention relates to a certain epoxy resin composition and a coating composition containing the epoxy resin composition.

Conventionally, epoxy resins are used in various fields as they can form a coating film having excellent adhesiveness to metal, retort resistance, chemical resistance, workability and the like. However, in the case of heat-curable epoxy resin coatings, such as can inner coatings, PCM coatings or powder coatings, that requires high performance, there is a problem that a baking furnace and the like are stained by fume generated in baking. Cause of this fume is considered to be volatilization of low molecular weight components or decomposition products contained in amino resins, phenolic resins, resole resins, urea resins, blocked isocyanates or the like used as a curing agent, and blocking agents dissociated, and volatilization of low molecular weight components or their decomposition products contained in epoxy resins. Various materials have conventionally been reported as decomposition products generated by thermal decomposition of epoxy resins. As one of those, a monomer component, such as bisphenols generated from bisphenol type epoxy resins, have recently become a problem as one of components staining a baking furnace or the like.

Therefore, it is desirable to provide an epoxy resin composition that does not stain a baking furnace or the like by suppressing generation of components such as bisphenols generated and volatilized by thermal decomposition of epoxy resins, and a coating composition containing such epoxy resin composition.

SUMMARY OF THE INVENTION

An epoxy resin composition comprising at least one epoxy resin a thermal decomposition inhibitor for an epoxy resin in an amount of 0.001 to 5 parts by weight per 100 parts by weight of an epoxy resin.

DETAILED DESCRIPTION OF THE INVENTION

As a result of extensive investigations on a method for suppressing bisphenols or the like decomposed and generated in baking, inventors of the present invention have found that volatile components generated in thermal decomposition can be suppressed by using a thermal decomposition inhibitor in an epoxy resin composition. We have found that the epoxy resin composition of the invention suppresses generation of volatile components by decomposition in baking and does not stain a baking furnace, without impairing physical properties such as workability, adhesiveness, retort resistance, chemical resistance, etc. The present invention includes the following.

The epoxy resin used in the present invention includes bisphenol type epoxy resins such as bisphenol A, bisphenol F, bisphenol S or halogenated bisphenol A, (bisphenol-based), biphenyl type epoxy resins, ester type epoxy resins such as dibasic acid, alicyclic epoxy resins, and terpene-diphenol type epoxy resins. Further, alkyl phenol novolak epoxy resins such as phenol novolak epoxy resins or cresol novolak epoxy resins, novolak epoxy resins of bisphenol A, and the like can also be used. Those epoxy resins may be used in one kind or a combination of two kinds or more.

Particularly preferable epoxy resin is a bisphenol type epoxy resin having an epoxy equivalent of 170 or more, preferably 400 or more, and more preferably 1000 or more. Examples of such an epoxy resin include bisphenol A type epoxy resins (bisphenol A based, where the epoxy resin is derived from bisphenol A by glycidation and optionally modification by advancement and the like), bisphenol F type epoxy resins, and epoxy resins obtained by direct synthesis method or indirect synthesis method of their mixture, wherein those epoxy resins have a bisphenol A content of 10 ppm or less, and preferably 3 ppm.

If the bisphenol A content is not less than 10 ppm, this content itself stains a baking furnace, which is not desirable. Preferably, the epoxy resin contains a component which volatilizes by heating in an amount of 10 ppm or less.

The epoxy resin composition of the present invention contains a thermal decomposition inhibitor. The thermal decomposition inhibitor used herein is generally called an antioxidant.

The thermal decomposition inhibitor used in the present invention includes phosphorus type, sulfur type or phenol type compounds. The phenol type thermal decomposition inhibitor has a large decomposition suppression effect because of its radical capturing function, and is, therefore, particularly preferable.

Specifically, the phosphorus type compounds include tris(nonylphenyl)phosphite and tris(2,4-di-tert-butylphenyl) phosphite. The sulfur type compounds include dilauryl-3,3'-thiodipropionate and distearyldilauryl-3,3'-thiodipropionate. Phenol type compounds include tetrakismethylene-3(3,5'-di-tert-butyl-4'-hydroxyphenyl) propionate methane, n-octadecyl-3(3,5'-di-tert-butyl-4'-hydroxyphenyl) propionate, and 2,2'-methylenebis(3-methyl-6-tert-butylphenol).

Of those, tetrakismethylene-3(3,5'-di-tert-butyl-4'-hydroxyphenyl)propionate methane and n-octadecyl-3(3,5'-di-tert-butyl-4'-hydroxyphenyl)propionate are preferable. Those thermal decomposition inhibitors may be used alone or in combination of two kinds or more.

The preferred thermal decomposition inhibitor for an epoxy resin is a phenolic thermal decomposition inhibitor.

The amount of the inhibitor compounded is not particularly limited, but it is used so as to be in the range of 0.001 to 5 parts by weight, preferably 0.005 to 2 parts by weight, and more preferably 0.01 to 1 part by weight, per 100 parts by weight of the epoxy resin. If the compounding amount is not larger than 0.001, decomposed products generated by thermal decomposition can not sufficiently be suppressed, and on the other hand, if the amount is not less than 5 parts by weight, decrease in physical properties is remarkable, which is not desirable.

A method for compounding the thermal decomposition inhibitor is not particularly limited, but it is preferable to add the inhibitor after completion of the reaction of the epoxy resin or after melting the epoxy resin, and then melt mixing at 50 to 250° C. for 30 minutes to 5 hours. Further, the inhibitor can also be added in the course of or after completion of the coating production step.

The curing agent used in the epoxy resin coating composition of the present invention is curing agents used in general epoxy resins, such as polyamide amines, epoxy resin amine adducts, aliphatic polyamines, modified polyamines, aromatic amines, tertiary amines, hydrazide, dicyanediamide, imidazole, acid anhydrides, acid-terminated polyester resins, phenolic resins, urea resins, resole resins, amino resins, isocyanates and blocked isocyanates. Those can be used according to the purpose. Of those curing agents, curing agents that require baking at high temperature, such as phenolic resins, urea resins, resole resins, amino resins and blocked isocyanates are preferable.

The curable epoxy resin composition preferably contains a curing agent for an epoxy resin in an amount of 0.01 to 50 parts by weight per 100 parts by weight of the epoxy resin.

If necessary, the epoxy resin coating composition of the present invention can further contain resins such as xylene resin, petroleum resin, acrylic resin, polyester resin, alkyd resin, polyimide resin or epoxy resin, reactive or non-reactive diluents such as monoglycidyl ethers, dioctyl phthalate, benzyl alcohol or coal tar, fillers such as glass fiber, carbon fiber, silica, aluminum hydroxide, titanium dioxide, carbon black or iron oxide, and additives commonly used such as pigment, thickener, thixotropic agent, coloring agent, flow modifier, catalyst, curing accelerator, defoaming agent or various solvents.

EXAMPLES

The present invention is explained specifically with reference to the following examples, but the present invention is not limited to those examples. Parts and % represent parts by weight and % by weight, respectively.

Analyzing method of the resins obtained in the examples is described below.

(1) Measurement of epoxy equivalent: Measured according to JIS analytical method K7236.
(2) Viscosity: Butyl carbitol solution (solid content 40%) was prepared and viscosity was measured at 25° C. using Gardner Holdt viscometer.
(3) Measurement of bisphenol A: A UV detector was used in HPCL device, manufactured by Tosoh Corporation. A mobile phase used was acetonitrile/water system, and measurement was made at a flow rate of 1.0 L/min. A column used was TSK-GEL ODS-120T, manufactured by Tosoh Corporation. Quantification was obtained by a calibration curve of bisphenol A previously prepared.

Example 1

500 parts of EPIKOTE 1001F Resin (trade name: a product of Yuka Shell Epoxy K.K., bisphenol A type epoxy resin; epoxy equivalent=481 g/eq, viscosity=G+, bisphenol A content=1 ppm or less) were introduced into a 1-liter round-bottom separable flask equipped with a thermometer, a stirrer, a cooling pipe and a nitrogen inlet, and were melted by heating under nitrogen atmosphere. The system was maintained at 100° C. 0.25 part of tetrakismethylene-3(3,5'-di-tert-butyl-4'-hydroxyphenyl) propionate methane (trade name: IRUGANOX 1010, a product of Ciba Specialty Chemicals K.K., phenol type thermal decomposition inhibitor) was introduced into the molten resin. After mixing at 130 to 140° C. for 1 hour while stirring, the mixture was discharged on an aluminum dish. Epoxy resin composition (A-1) formed had an epoxy equivalent of 482 g/eq, a viscosity of G+ and a bisphenol A content of 1 ppm or less.

Example 2

500 parts of EPIKOTE 1001F Resin (trade name: a product of Yuka Shell Epoxy K.K., bisphenol A type epoxy resin; epoxy equivalent=481 g/eq, viscosity=G+, bisphenol A content=1 ppm or less) were introduced into a 1-liter round-bottom separable flask equipped with a thermometer, a stirrer, a cooling pipe and a nitrogen inlet, and were melted by heating under nitrogen atmosphere. The system was maintained at 100° C. 2.5 parts of tetrakismethylene-3(3,5'-di-tert-butyl-4'-hydroxyphenyl) propionate methane (trade name: IRUGANOX 1010, a product of Ciba Specialty Chemicals K.K., phenol type thermal decomposition inhibitor) were introduced into the molten resin. After mixing at 130 to 140° C. for 1 hour while stirring, the mixture was discharged on an aluminum dish. Epoxy resin composition (A-2) formed had an epoxy equivalent of 484 g/eq, a viscosity of G-H and a bisphenol A content of 1 ppm or less.

Example 3

500 parts of EPIKOTE 1009 Resin (trade name: a product of Yuka Shell Epoxy K.K., bisphenol A type epoxy resin; epoxy equivalent=2570 g/eq, viscosity=Z4+, bisphenol A content=1 ppm or less) were introduced into a 1-liter round-bottom separable flask equipped with a thermometer, a stirrer, a cooling pipe and a nitrogen inlet, and were melted by heating under nitrogen atmosphere. The system was maintained at 180° C. 0.25 part of tetrakismethylene-3(3,5'-di-tert-butyl-4'-hydroxyphenyl) propionate methane (trade name: IRUGANOX 1010, a product of Ciba Specialty Chemicals K.K., phenol type thermal decomposition inhibitor) was introduced into the molten resin. After mixing at 180 to 200° C. for 1 hour while stirring, the mixture was discharged on an aluminum dish. Epoxy resin composition (A-3) formed had an epoxy equivalent of 2,580 g/eq, a viscosity of Z4+ and a bisphenol A content of 1 ppm or less.

Example 4

500 parts of EPIKOTE 1009 Resin (trade name: a product of Yuka Shell Epoxy K.K., bisphenol A type epoxy resin; epoxy equivalent=2,570 g/eq, viscosity=Z4+, bisphenol A content=1 ppm or less) were introduced into a 1-liter round-bottom separable flask equipped with a thermometer, a stirrer, a cooling pipe and a nitrogen inlet, and were melted by heating under nitrogen atmosphere. The system was maintained at 180° C. 2.5 parts of tetrakismethylene-3(3,5'-di-tert-butyl-4'-hydroxyphenyl) -propionate methane (trade name: IRUGANOX 1010, a product of Ciba Specialty Chemicals K.K., phenol type thermal decomposition inhibitor) were introduced into the molten resin. After mixing at 180 to 200° C. for 1 hour while stirring, the mixture was discharged on an aluminum dish. Epoxy resin composition (A-4) formed had an epoxy equivalent of 2,587 g/eq, a viscosity of Z4+ and a bisphenol A content of 1 ppm or less.

Example 5

100 parts of each of the epoxy resin compositions (A-3) and (A-4) obtained in Examples 3 and 4, 150 parts of xylene and 150 parts of cyclohexanone were charged in a similar apparatus to that used in Example 1 and were dissolved to prepare a solution having a resin concentration of 25%. 18 parts of Yuban 20SE60 (trade name: a product of Mitsui Chemicals, Inc., melamine resin) as a curing agent, and 0.1 part of 85% phosphoric acid were mixed with this resin solution to obtain uniform coatings (P-1) and (P-2).

Example 6

100 parts of the above-mentioned EPIKOTE 1009 Resin, 150 parts of xylene and 150 parts of cyclohexanone were charged in a similar apparatus to that used in Example 1 and were dissolved to prepare a solution having a resin concentration of 25%. 18 parts of Yuban 20SE60 (trade name: a product of Mitsui Chemicals, Inc., melamine resin), 0.1 part of 86% phosphoric acid and 0.5 part of tetrakismethylene-3(3,5'-di-tert-butyl-4'-hydroxyphenyl) propionate methane (trade name: IRUGANOX 1010, a product of Ciba Specialty Chemicals K.K., phenol type thermal decomposition inhibitor) were added to this resin solution, and those were mixed to obtain a uniform coating (P-3).

Example 7

0.1 g of each of the epoxy resin compositions (A-1) to (A-4) obtained by adding a thermal decomposition inhibitor to an epoxy resin, obtained in Examples 1 to 4 was accurately weighed and was sealed in a 50 ml measuring flask. This sample was placed in an oven maintained at 210° C. 60 minutes after reaching 210° C., the sample was taken out of the oven. After cooling, the epoxy resin composition was dissolved with THF making the volume up. As a method for confirming an effect of suppressing a thermal decomposition product which volatilizes, bisphenol A content generated by decomposition was determined with HPLC. Results are shown in Table 1.

Example 8

0.1 g of each of the epoxy resin compositions (A-1) to (A-4) obtained by adding a thermal decomposition inhibitor to an epoxy resin, obtained in Examples 1 to 4, was accurately weighed and was sealed in a 50 ml measuring flask. This sample was placed in an oven maintained at 250° C. 60 minutes after reaching 250° C., the sample was taken out of the oven. After cooling, the epoxy resin composition was dissolved with THF making the volume up. As a method for confirming a suppression effect of a thermal decomposition product which volatilizes, bisphenol A content generated by decomposition was determined with HPLC. Results are shown in Table 1.

Example 9

0.4 g of each of the epoxy resin coating compositions (P-1), (P-2) and (P-3) obtained in Examples 5 and 6 was accurately weighed in a 50 ml measuring flask. This sample was placed in an oven maintained at 250° C. 60 minutes after reaching 250° C., the sample was taken out of the oven. After cooling, the epoxy resin coating composition was dissolved with THF making the volume up. After filtration, as a method for confirming a suppression effect of a thermal decomposition product which volatilizes, bisphenol A content generated by decomposition was determined with HPLC. Results are shown in Table 1.

Example 10

100 parts of the epoxy resin composition (A-4) obtained in Example 4, 150 parts of xylene and 150 parts of cyclohexanone were charged in a similar apparatus to that used in Example 1 and were dissolved to prepare a solution having a resin concentration of 25%. 22 parts of Hitanol 4010 (trade name: a product of Hitachi Chemical Co., Ltd., resole type phenolic resin, resin concentration 50%) and 0.1 part of 85% phosphoric acid were added to this resin solution, and those were mixed to obtain a uniform coating. The coating obtained was coated on an aluminum plate having a thickness of 0.3 mm with a bar coater, and was baked at 210° C. for 10 minutes to obtain a coating film having a film thickness of 10 $\mu$m. The amount of bisphenol A generated was measured in the same manner as in Example 9 except that the conditions were 210° C. and 10 minutes. This test piece was evaluated as mentioned below, and the results are shown in Table 2.

(Coating film performance evaluation method)

1. Adhesiveness 100 squares of 1 mm×1 mm were formed on a coating film by cutting it with a cutter knife. A pressure-sensitive adhesive tape was adhered onto the coating film, and was instantaneously peeled therefrom. The number of residual squares of the coating film on a substrate was visually measured.

2. Bending workability

A coated plate was bent such that the coated surface faces outside, and was pressed at 23° C. under a pressure of 15 kg/cm$^2$. Current value of the bent portion was measured using a current conduction tester, and the degree of damage of the coating film was evaluated with the following three ratings.

O: Current value is less than 1 mA.

Δ: Current value is 1 mA or more, and less than 5 mA.

X: Current value is 5 mA or more.

3. Retort resistance

A coated plate was subjected to retort treatment at 125° C. for 30 minutes, and the degree of whitening of the coating film was visually evaluated with the following three ratings.

O: No change at all

Δ: Partial whitening

X: Whitening on the entire surface

Comparative Example 1

A sample was prepared and heat treated, and bisphenol A content was measured, in the same manner as in Example 7, except for using sample (B-1) obtained by melting the raw material, EPIKOTE 1001F Resin, used in Examples 1 and 2 at 130 to 140° C. for 1 hour in the same manner as in Examples 1 and 2 without adding a thermal decomposition inhibitor, and then discharging the same on an aluminum dish. Results are shown in Table 1.

Comparative Example 2

A sample was prepared and heat treated, and a bisphenol A content was measured in the same manner as in Example 8, except for using the raw material, EPIKOTE 1001F (B-1), used in Comparative Example 1. Results are shown in Table 1.

Comparative Example 3

A sample was prepared and heat treated, and a bisphenol A content was measured, in the same manner as in Example 7, except for using sample (B-2) obtained by melting the raw material, EPIKOTE 1009 Resin, used in Examples 3 and 4 at 180 to 200° C. for 1 hour in the same manner as in Examples 3 and 4 without adding a thermal decomposition inhibitor, and then discharging the same on an aluminum dish. The results are shown in Table 1.

Comparative Example 4

A sample was prepared and heat treated, and a bisphenol A content was measured in the same manner as in Example 8, except for using the raw material, EPIKOTE 1009 (B-2), used in Comparative Example 3. The results are shown in Table 1.

Comparative Example 5

A coating (P-4) was prepared in the same manner as in Example 5 except for using the raw material, EPIKOTE 1009 (B-2), used in Comparative Example 3, a sample was prepared and heat treated in the same manner as in Example 9, and a bisphenol A content was measured. Results are shown in Table 1.

Comparative Example 6

A coating was prepared, a test piece was prepared, and the amount of bisphenol A generated was measured, in the same manner as in Example 10 except for using the raw material, EPIKOTE 1009 (B-9), used in Comparative Example 3. Evaluation results of the performance of a coating film are shown in Table 2.

TABLE 1

|  | Temperature | Raw material epoxy resin | Epoxy resin | Amount of thermal material added wt % | Amount of decomposition bisphenol A generated ppm |
|---|---|---|---|---|---|
| Example 7 | 210° C. | EPIKOTE 1001F | A-1 | 0.05 | 1 |
|  |  |  | A-2 | 0.5 | 1> |
|  |  | EPIKOTE 1009 | A-3 | 0.05 | 1> |
|  |  |  | A-4 | 0.5 | 1> |
| Example 8 | 250° C. | EPIKOTE 1001F | A-1 | 0.05 | 300 |
|  |  |  | A-2 | 0.5 | 100 |
|  |  | EPIKOTE 1009 | A-3 | 0.05 | 50 |
|  |  |  | A-4 | 0.5 | 10 |
| Example 9 | 250° C. | EPIKOTE 1009 | P-1 | 0.05 | 8 |
|  |  |  | P-2 | 0.5 | 2 |
|  |  |  | P-3 | 0.5 | 2 |
| Comparative Example 1 | 210° C. | EPIKOTE 1001F | B-1 | 0 | 10 |
| Comparative Example 2 | 250° C. | EPIKOTE 1001F | B-1 | 0 | 1000 |
| Comparative Example 3 | 210° C. | EPIKOTE 1009 | B-2 | 0 | 3 |
| Comparative Example 4 | 250° C. | EPIKOTE 1009 | B-2 | 0 | 100 |
| Comparative Example 5 | 250° C. | EPIKOTE 1009 | P-4 | 0 | 20 |

TABLE 2

|  | Example 10 | Comparative Example 6 |
|---|---|---|
| Epoxy resin | A-4 | B-2 (EPIKOTE 1009) |
| Raw material epoxy resin | EPIKOTE 1009 |  |
| Amount of thermal decomposition inhibitor added (wt %) | 0.5 | 0 |
| (Coating film performance evaluation) |  |  |
| Adhesiveness | 100 | 100 |
| Bending property | 0 | 0 |
| Retort resistance | 0 | 0 |
| Amount of bisphenol A generated (ppm) | 1> | 3 |

As is apparent from Table 1 and Table 2, generation of decomposed products by heat treatment was suppressed in the epoxy resin compositions of Examples 1 to 4 and the coating compositions of Examples 5 and 6 obtained in the present invention, as compared with that in the raw material epoxy resin and the coating compositions of Comparative Examples 1 to 5. The coating film obtained from Example 10 are excellent in workability, adhesiveness and retort resistance, and no degrading in physical properties was observed.

The epoxy resin composition of the present invention can suppress generation of decomposed components of epoxy resin in baking, without impairing excellent physical properties such as workability, adhesiveness and chemical resistance of epoxy resins. Therefore, the epoxy resin composition of the present invention is extremely effective to prevent stain in a baking furnace and the like.

We claim:

1. A method for suppressing staining of a baking furnace comprising baking a coating composition comprising an epoxy resin composition, said epoxy resin composition comprising an epoxy resin and a thermal decomposition inhibitor for said epoxy resin in an amount of 0.001 to 5 parts by weight per 100 parts by weight of an epoxy resin, said method comprising baking said coating in the baking furnace and generating volatile components during baking, wherein generation of said volatile components are suppressed relative to baking said coating in the absence of said thermal decomposition inhibitor.

2. The method of claim 1 wherein the epoxy resin comprises a component which volatizes by heating in an amount of 10 ppm or less.

3. The method of claim 1 wherein the epoxy resin comprises a bisphenol A based epoxy resin.

4. The method of claim 3 wherein the bisphenol A based epoxy resin contains bisphenol A in an amount of 10 ppm or less.

5. The method of claim 2 wherein the epoxy resin has an epoxy equivalent of 170 or more.

6. The method of claim 1 wherein the thermal decomposition inhibitor for an epoxy resin is a phenolic thermal decomposition inhibitor.

7. The method of claim 2 wherein the thermal decomposition inhibitor for an epoxy resin is a phenolic thermal decomposition inhibitor.

8. The method of claim 1 wherein the thermal decomposition inhibitor for an epoxy resin is a phenolic thermal decomposition inhibitor.

9. The method of claim 1, wherein the thermal decomposition inhibitor is added to said epoxy resin, to a molten epoxy resin, or in the course of or after completion of a production step for making an unbaked coating.

10. The method of claim 1, wherein the volatile components generated during baking comprise low molecular weight components contained in the epoxy resin.

11. The method of claim 1, wherein the volatile components generated during baking comprise decomposition products formed during heating.

12. The method of claim 1, wherein the volatile components generated during baking comprise bisphenol A.

13. The method of claim 12, wherein the thermal decomposition inhibitor comprises tetrakismethylene-3(3,5'-di-tert-butyl-4'-hydroxyphenyl) propionate methane, n-octadecyl-3(3,5' di-tert-butyl-4'hydroxyphenyl) propionate, and/or 2,2'-methylenebis(3-methyl-6-tert-butylphenol).

14. The method of claim 13, wherein the thermal decomposition inhibitor comprises tetrakismethylene-3(3,5'-di-tert-butyl-4'-hydroxyphenyl) propionate methane.

15. The method of claim 8, wherein the volatile components generated during baking comprise bisphenol A.

16. The method of claim 8, wherein the thermal decomposition inhibitor is added to said epoxy resin, to a molten epoxy resin, or in the course of or after completion of a production step for making an unbaked coating.

17. The method of claim 8, wherein the volatile components generated during baking comprise bisphenol A.

18. The method of claim 17, wherein the thermal decomposition inhibitor comprises tetrakismethylene-3(3,5'-ditert-butyl-4'-hydroxyphenyl) propionate methane, n-octadecyl-3(3,5'di-tert-butyl-4'hydroxyphenyl) propionate, and/or 2,2'-methylenebis(3-methyl-6-tert-butylphenol).

19. A method for suppressing staining of a baking furnace comprising baking a coating composition comprising an epoxy resin composition, said epoxy resin composition comprising:

(a) an epoxy resin having an epoxy equivalent weight of 170 or more and a component which volatizes by heating in an amount of 10 ppm or less; and (b) a thermal decomposition inhibitor comprising a phenolic thermal decomposition inhibitor in an amount of 0.001 to 5 parts by weight per 100 parts by weight of said epoxy resin, and generating volatile components during baking, wherein generation of said volatile components are suppressed relative to baking said coating in the absence of said thermal decomposition inhibitor.

* * * * *